March 2, 1937. J. P. TARBOX 2,072,412
BRAKE MECHANISM
Filed Dec. 1, 1932 2 Sheets-Sheet 1

INVENTOR.

John P. Tarbox

March 2, 1937.　　　　J. P. TARBOX　　　　2,072,412
BRAKE MECHANISM
Filed Dec. 1, 1932　　　2 Sheets-Sheet 2
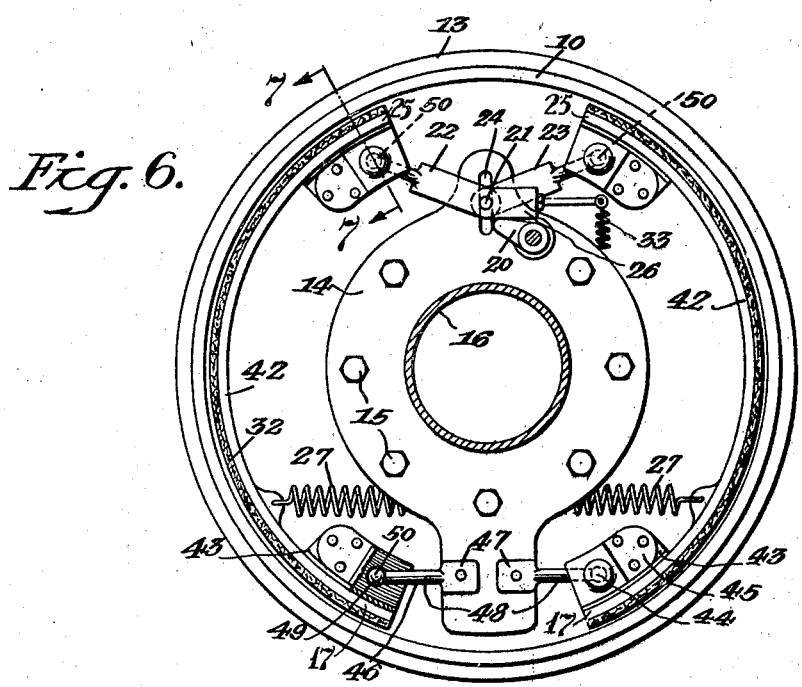
Fig. 6.
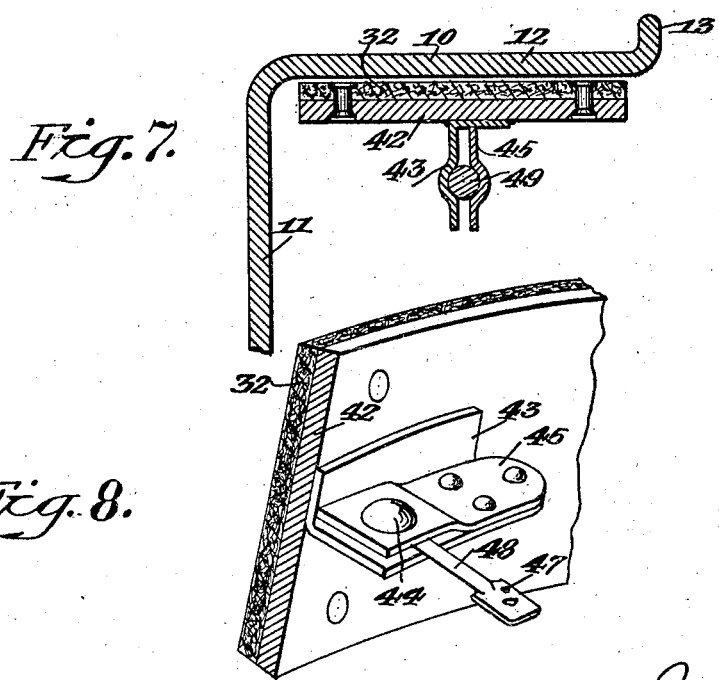
Fig. 7.
Fig. 8.
INVENTOR.

Patented Mar. 2, 1937

2,072,412

UNITED STATES PATENT OFFICE 2,072,412

BRAKE MECHANISM

John P. Tarbox, Philadelphia, Pa., assignor to Budd Wheel Company, Philadelphia, Pa., a corporation of Pennsylvania Application December 1, 1932, Serial No. 645,159

3 Claims. (Cl. 188—78)

This invention relates to vehicle brakes, and comprehends improvements in this art.

An object of my invention is the provision of a brake drum and shoe assembly which is highly efficient under all conditions of temperature and pressure. Brakes of the prior art have been almost universally subject to the disadvantage of becoming ineffective in proportion to the increase in drum temperature, such ineffectiveness being due primarily to bell-mouthing, or conical expansion of the drums resulting from repeated braking operations. This invention has been directed to an improvement of braking characteristics under all temperature conditions.

Broadly, I have achieved the objects of my invention by providing flexible brake shoes adapted to conform substantially throughout to the brake drum contour under all ranges of bell-mouthing and other irregular expansion caused by heat and pressure.

Among other things, the heat-dissipating characteristics of braking mechanisms have been improved by providing a heat conducting lining.

Other objects include a provision for full shoe flexibility substantially throughout the entire length thereof to provide ready automatic adjustment of the shoe to changes in drum contour.

Other objects and advantages will be apparent after a reading of the sub-joined specification in the light of the attached drawings, in which, Figure 1 is a side elevational view of a brake assembly embodying this inventive concept.

Figure 6 is an elevation through another form of construction.

Figure 7 is a cross section on line 7—7 of Figure 6.

Figure 8 is a partial perspective of the form of a brake shoe application of Figs. 6 and 7.

Figure 1:
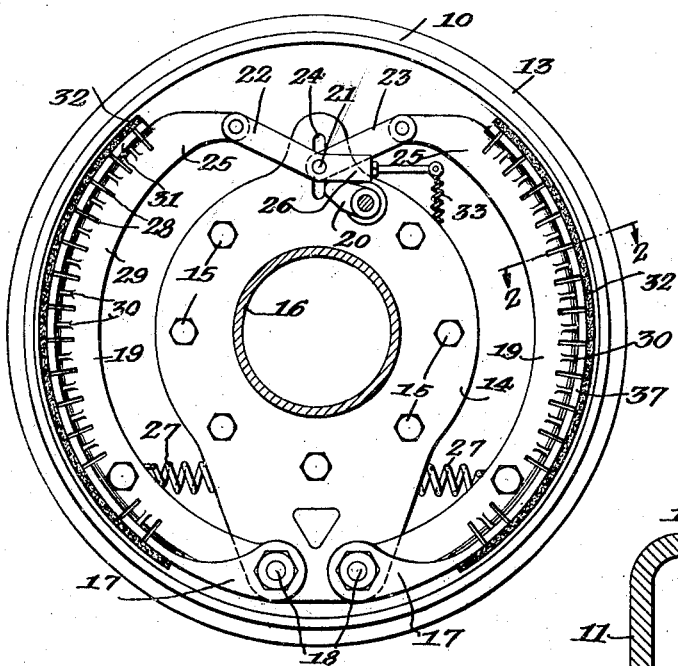
Figure 3:
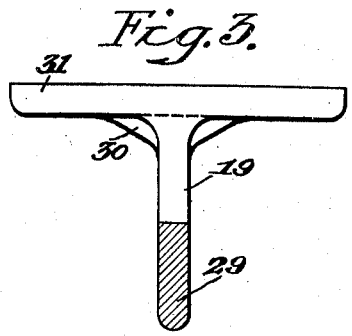
Figure 3 is a detail sectional view of the shoe shown in Figures 1, 2 and 4.

Referring now to the drawings in more detail, and particularly to Figs. 1 through 5, brake drum 10, illustrated as of the stamped sheet metal type, comprises a central radially extending securing portion 11, an axially extending braking portion 12 and a marginal flange 13. Brake drum 10 is secured through appropriate holes in the radial flange 11 to the usual wheel hub, not shown. Backing plate 14 is secured through bolts 15 to a flanged collar on the axle housing 16 and is held thereby in position against rotation.

In order to illustrate fully my invention, I have shown a two-shoe brake, mechanically operated, the shoes 19 of which are adjustably pivoted at the adjacent heel portions 17 on axially extending bolts 18 passing through the backing plate 14. The opposite ends of the brake shoes 19 are actuated by a rotatable cam 20 which forces the pivot point 21, of operating levers 22 and 23, vertically upward in the slot 24 of the backing plate 14, forcing the toe ends 25 of the respective brake shoes 19 apart circumferentially to effect an operation of the brake. Lever 22 is provided with an extension 26 extending beyond the pivot point 21, to which is connected a return spring 33 which urges the shoes 19 to a normal retracted position after an actuation. Spring 27 is provided between the two shoes 19 near the heel portions to further aid in the retraction thereof.

Figure 2:
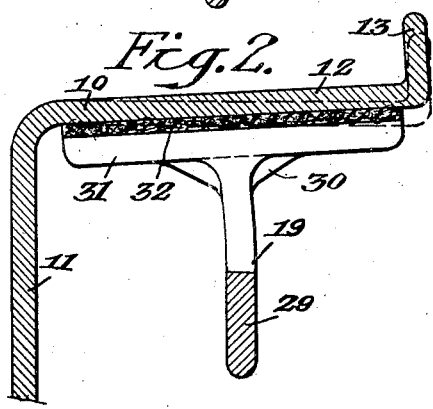
Figure 2 is a detail sectional view taken on line 2—2 of Figure 1, portraying an actual condition of usage.
Figure 4:
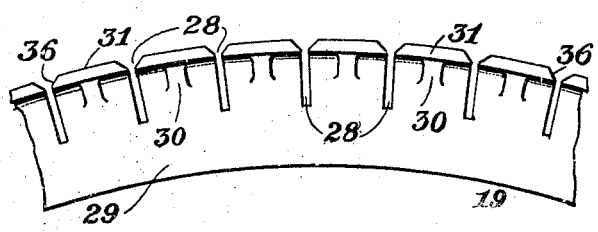
Figure 4 is a partial side elevational view of the shoe shown in Figures 1 to 3.

As mentioned heretofore, brake drums, under the influence of heat and pressure, tend to assume a conical contour, known as bell mouthing, as shown in Fig. 2, in which the dotted lines illustrate the natural contour of the drum while the full lines show the drum distorted. It is quite obvious that with the use of rigid brake shoes of the T-section type, the head portions tend to remain truly cylindrical, and to expand uniformly, thus forcing the brake lining into contact with a small area of the braking flange 12 adjacent the radial flange 11. This produces an uneven wear on the lining, and very noticeably decreases the efficiency of the brakes due to the decrease of actual braking contact.

In accordance with my invention I have obviated this condition by so designing the brake shoes that the head portions will be transversely fully flexible either entirely or partly dependently of the web portions thereof and thus may follow the brake drum in substantial parallelism throughout all of the ranges of irregular expansion and conicity which have hitherto been known.

I prefer to use a T-section shoe, provided with a plurality of transversely extending slots 28 extending radially inwardly to substantially the mid point of the web portion 29 of the shoe. This transverse slotting gives, in effect, a series of independently suspended wear surface supporting elements, free to pivot in either direction from that position defined by a truly cylindrical contour. The slotting does not destroy the rigidity of the shoe 19 as far as the application thereof is concerned, inasmuch as it is relatively rigid in the plane of the web, the resiliency or radial flexibility being pronounced only in planes axially removed from the plane of the web 29. By providing transversely extending ribs 30 between the head portion 31 and the web 29 I remove the bending point from the juncture between the web and the head and distribute the bending movement evenly over a greater length of web.

Inasmuch as the shoes are operated in substantially the same manner as are regular brake shoes of T-section, they act normally under all conditions of use. While the drum 10 is in a truly cylindrical condition, the shoes act in exactly the same manner as do regular T-section shoes. The advantage of my invention becomes apparent, however, when the drum becomes heated and begins to expand irregularly. The head 31 of shoe 19, comprised of the individual portions between the slots 28, assumes a frustro-conical contour substantially parallel with the contour of the drum 10, and thus the lining 32 is forced into contact with the drum evenly, maintaining full contact with the drum and also the full efficiency of the brakes.

Figure 5:
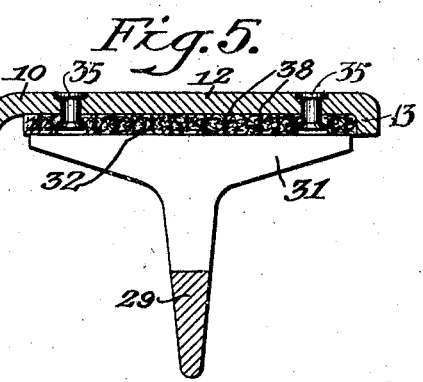
Figure 5 is a section similar to Figure 2 through a slightly different form of the construction.

In Fig. 5, I have illustrated a modified form of the invention, in which the lining 32 is secured to the inner surface of the axially extending braking flange 12 of a brake drum 10. A short radially extending marginal flange 13 serves to locate the lining axially, the lining being secured to the drum by one of the usual means, for example, rivets 35. The shoe is of somewhat modified form, the head portion 31 and web 29 being of angular tapered cross section. This shoe, as described heretofore, is slotted transversely, in order to impart that degree of flexibility necessary to allow the head of the shoe to follow the irregular expansion of the drum and lining in order to insure full braking contact. The edges 36 of the individual lands 37 are beveled slightly in order to prevent any possible injury to the lining. This form of my invention is equally as efficient as that last described.

In connection with the securement of the lining 32 to the drum 10, I have sought to increase the heat carrying capacity of the lining by permeating the interior thereof with heat conducting material such as aluminum wire as indicated by numeral 38. This wire is preferably in the form of short radially extending lengths, permeating the interior of the lining and preferably inserted therein during the formation of the lining. Such provision for the conduction of heat away from the actual braking area tends to aid materially the cooling of the drums by increasing the normal rate of heat travel to the open air.

Another form of shoe is of T-section, and may be transversely slotted or may be of such thin radial cross section as to be flexible without being slotted. A shoe such as this is anchored at one end and actuated at the opposite end by U-shaped members presenting radially outwardly and surrounding the web portion. A rivet pin passes through each U-shaped member and fits loosely within a suitable hole in each end of the web, thus affording a flexible or floating connection which allows the head of the shoe to follow the brake drum irrespective of the amount of the irregular expansion which may occur in the drum.

An application of one form of the invention is shown in Figs. 6, 7 and 8 as applied to a band type brake, the band or shoe portion being indicated by numeral 42. Suitable fixtures are provided at the opposite ends of this shoe, such fixtures being indicated by numeral 43 and comprising angular sheet metal brackets welded to the band 42 and embodying a hemispherical depression 44 adjacent the end thereof. To bracket 43 is riveted a cover plate 45 having a complemental hemispherical portion therein. The anchor member 46 is comprised of a flattened portion 47 through which it is pivoted to the backing plate 14, a shank portion 48 and a spherical end portion 49 which fits within the complemental hemispherical depressions 44 in the members 43 and 35. The opposite end of the band 42 is similarly fitted by providing a spherical portion 50 on the end of lever 22. It will be seen that this arrangement provides for a ball joint mounting at both ends of the band 42, thus allowing complete flexibility and insuring complete contact with the brake drum 10, irrespective of the degree of angularity or conicity thereof under any condition of heat or pressure.

It will be seen that the various illustrated showings herein are each and all directed to the compensation for irregular expansion and bell mouthing of brake drums. The various forms of transplit and flexible shoes, and the heat conducting lining all contribute to successful operations of the device. The objects of the invention, namely, to provide a brake drum and shoe assembly which would be equally efficient under all conditions of temperature and pressure, and the improvement of the heat dissipating characteristics of brakes have been achieved in full.

Some of the figures show the wear surface upon the shoe and others have it upon the drum. This is optional. The basic thought being the full flexibility or adaptability of the brake shoes to the drum contour when irregularity occurs.

Modifications within the true spirit and scope of this invention are covered by the appended claims.

What I claim is:

1. A brake shoe of T-section, the web head of said shoe being transversely split at frequent intervals throughout a portion of its radial extent, whereby the head portion of said shoe is rendered flexible.

2. A brake shoe generally T-shape in cross section having a continuous web portion and a head portion which is interrupted at a plural number of points by cross slots, thereby providing a series of unconnected transversely flexible portions adapted to receive the thrust due to braking pressure.

3. In brake mechanism, a drum, a brake shoe generally T-shape in cross section, a wear surface affixed to one of said members, said shoe having the head thereof and the adjacent portion of the web interrupted by a series of cross slots which render all portions of the head transversely twistable so that the shoe may move into parallel relation with respect to the drum irrespective of the conicity or irregular expansion of the latter.

JOHN P. TARBOX.